(12) United States Patent
Guo et al.

(10) Patent No.: US 10,320,800 B2
(45) Date of Patent: Jun. 11, 2019

(54) FRAUD DETECTION MECHANISM

(71) Applicant: INTERNATIONAL BUSINESS MACHINES CORPORATION, Armonk, NY (US)

(72) Inventors: Shang Q. Guo, Cortlandt Manor, NY (US); Jonathan Lenchner, North Salem, NY (US); Maharaj Mukherjee, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 15/456,685

(22) Filed: Mar. 13, 2017

(65) Prior Publication Data

US 2018/0262511 A1 Sep. 13, 2018

(51) Int. Cl.
*H04L 29/06* (2006.01)

(52) U.S. Cl.
CPC .......... *H04L 63/102* (2013.01); *H04L 63/083* (2013.01)

(58) Field of Classification Search
CPC ..... H04L 63/10; H04L 63/101; H04L 63/102; H04L 63/083
See application file for complete search history.

(56) References Cited

U.S. PATENT DOCUMENTS

| | | | |
|---|---|---|---|
| 7,039,951 B1 | 5/2006 | Chaudhari et al. | |
| 7,908,645 B2 | 3/2011 | Varghese et al. | |
| 8,151,327 B2 | 4/2012 | Eisen | |
| 8,468,598 B2 | 6/2013 | Hebert | |
| 8,539,567 B1 * | 9/2013 | Logue | H04L 63/0884 726/7 |
| 8,739,278 B2 | 5/2014 | Varghese | |
| 9,037,113 B2 | 5/2015 | Balasubramaniyan et al. | |
| 9,262,642 B1 * | 2/2016 | Roth | G06F 21/62 |
| 9,396,317 B2 * | 7/2016 | Jakobsson | G06F 21/33 |
| 2005/0039057 A1 | 2/2005 | Bagga et al. | |

(Continued)

FOREIGN PATENT DOCUMENTS

WO    WO 2015/094873    *    6/2015

OTHER PUBLICATIONS

Singh et al., "Fraud Detection by Monitoring Customer Behavior and Activities," Internation Journal of Computer Application, Feb. 2015, pp. 23-32, https://pdfs.semanticscholar.org/6d6b/11d889cbd132267532a9330b917f8a096524.pdf (Year: 2015).*

(Continued)

*Primary Examiner* — Theodore C Parsons
*Assistant Examiner* — Carlos M De Jesus Lassala
(74) *Attorney, Agent, or Firm* — Cantor Colburn LLP; Kurt Goudy

(57) ABSTRACT

Embodiments include methods, systems and computer program products for providing access to a secure service. Aspects include receiving, from a user device, a request to access a secure service, the request including access information and receiving, from the user device, a requested action on the secure service. Aspects also include correlating the access information and the requested action with stored information associated with the user device and performing the requested action, in response to said correlating.

20 Claims, 5 Drawing Sheets

(56) References Cited

U.S. PATENT DOCUMENTS

| | | | | |
|---|---|---|---|---|
| 2014/0295956 A1* | 10/2014 | Katz | ............. | G07F 17/3241 |
| | | | | 463/29 |
| 2014/0313007 A1* | 10/2014 | Harding | ............. | G07C 9/00158 |
| | | | | 340/5.52 |
| 2016/0226914 A1* | 8/2016 | Doddy | ............. | G06F 21/45 |
| 2017/0034183 A1* | 2/2017 | Enqvist | ............. | H04L 63/08 |
| 2017/0180388 A1* | 6/2017 | Belz | ............. | H04L 63/105 |
| 2017/0337362 A1* | 11/2017 | Arunachalam | ............. | H04L 63/0861 |

OTHER PUBLICATIONS

Amin et al., "Biometric and Traditional Mobile Authentication Techniques: Overviews and Open Issues", Bio-inspiring cyber security and cloud services: trends and innovations. Springer Berlin Heidelberg, 2014. 423-446. (Background).

* cited by examiner

FRAUD DETECTION MECHANISM

BACKGROUND

The present disclosure relates to the field of fraud detection and access control, and more specifically, to authenticating and controlling access to a secure service.

In general, fraud prevention and user authentication policies are defined conservatively with the intent of better protecting the secure service. However, conservative user authentication and fraud protection mechanisms can lead to customer frustration when the mechanisms improperly prevent an authorized user from accessing the secure service.

SUMMARY

In accordance with one embodiment, a computer-implemented method for securing access to a host site is provided. The method includes receiving, from a user device, a request to access a secure service, the request including access information and receiving, from the user device, a requested action on the secure service. The method also includes correlating the access information and the requested action with stored information associated with the user device and performing the requested action, in response to said correlating.

Other embodiments include a system and a computer program product.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Embodiments of the present disclosure include systems, computer program products, and methods for providing access to a secure service.

In general, banks and other companies that provide secure services utilize both fraud prevention and user authentication mechanisms. The purpose of user authentication is typically to ensure that the user is who he or she says that they are and the purpose of the fraud detection is to prevent tampering with the secure service. One of the most common fraud prevention techniques utilized is to block access to a secure service after a certain number of failed attempts to access the service. This type of policy is generally relied upon to deter brute force attacks on the secure service, where a computer tries to access the secure service by trying all combinations of a password.

In some embodiments of the present invention, access to a secure service can be granted to a user device that provides an incorrect password, based on a determination that the risk of fraud is low. In some embodiments, a fraud score may be calculated based on a security level of a user requested action. For example, the fraud score associated with a request to deposit a check for a small dollar amount to an account could be lower than a fraud score for a request to withdraw a large amount of cash from the account. In some embodiments, the fraud score can also be based upon a correlation between one or more of: a provided password and a most recently or previously stored password(s); the requested access to a history of the access to the secure service: and a user profile associated with the user device.

Figure 1:
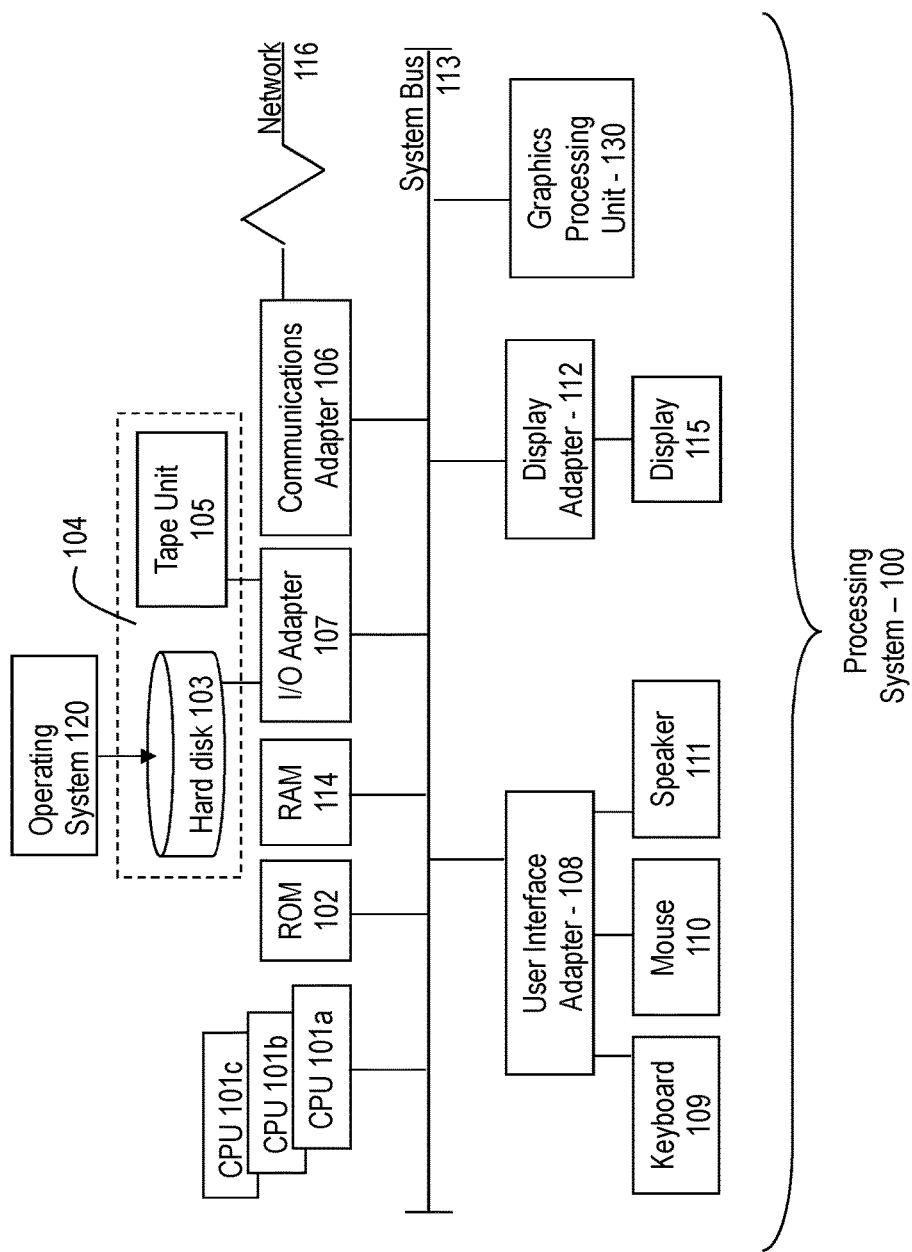
FIG. 1 illustrates an example of a computer system in accordance with one or more embodiments of the present invention.

FIG. 1 illustrates an example of a computer system in accordance with one or more embodiments of the present invention. As shown, a processing system 100 one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are operably coupled to various components of system 100 via system bus 113. Read only memory (ROM) 102 is coupled to the system bus 113 and may include a basic input/output system (BIOS), which controls certain basic functions of system 100.

Figure 2:
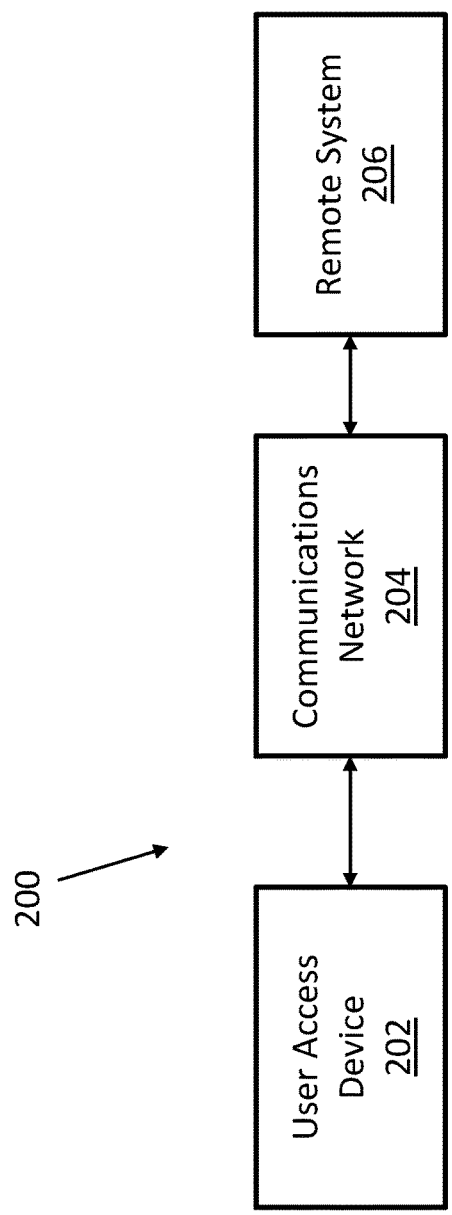
FIG. 2 illustrates another exemplary system in accordance with one or more embodiments of the present invention.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with network 116 enabling system 100 to communicate with other (internal or external) systems (not depicted). In some embodiments, network 116 can be a communications network 204 (FIG. 2).

Referring again to FIG. 1, a screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters, which may include protocols, such as the Peripheral Component Interconnect (PCI) protocol. Additional exemplary input/output devices are shown as connected to system bus 113 via user interface adapter 108 and display adapter 112. In one or more embodiments, keyboard 109, mouse 110, and speaker 111 are all interconnected to bus 113 via user interface adapter 108, which may be embodied (by way of example only) as multiple device adapters (not depicted) or may combine one or more device adapters into a single integrated circuit (sometimes referred to as a super I/O chip).

Thus, as illustrated in FIG. 1, processing system 100 includes: processing capability in the form of processors 101; memory in the form of ROM 102, RAM 114 (sometimes referred to as system memory) and mass storage 104; input means in the form of keyboard 109 and mouse 110;

and output capability in the form of speaker 111 and display 115. In one or more embodiments, a portion of system memory 114 and mass storage 104 collectively store an operating system, whose functions can include coordination of various system components. The memory can also store one or more applications, that when executed by the processor 101, perform one or more methods of the present invention.

Referring to FIG. 2, a system 200 in accordance with one or more embodiments of the present invention. In some embodiments, system 200 can be implemented as a client-server architecture. As depicted, system 200 includes a user access device 202 in communication with a remote system 206, which hosts the secure service, via a communications network 204. In some embodiments, user access device 202 can be a mobile device, such as a mobile phone that is operably coupled to remote system 206 via communications network 204. In some embodiments, remote system 206, can embody aspects of system 100 depicted in FIG. 1, in which the user device 202 accesses an online banking service of remote system 206 via hard-wired e.g., "Ethernet" and/or wireless e.g., "cellular" or "Wifi" aspects of network 116. In some embodiments, remote system 206, can be partly (or entirely) embodied in a so-called "cloud" environment associated with network 204. In some embodiments, communications network 204 can include an internal local area network (LAN) and/or a public communications network such as the Internet, or a combination of various networks.

For purposes of the example depicted in FIG. 2, user access device 202 can be an automated teller machine (ATM) and the remote system 206 can be a banking computer system. One or more components of system 200 include security protections in accordance with the present invention.

Figure 3:
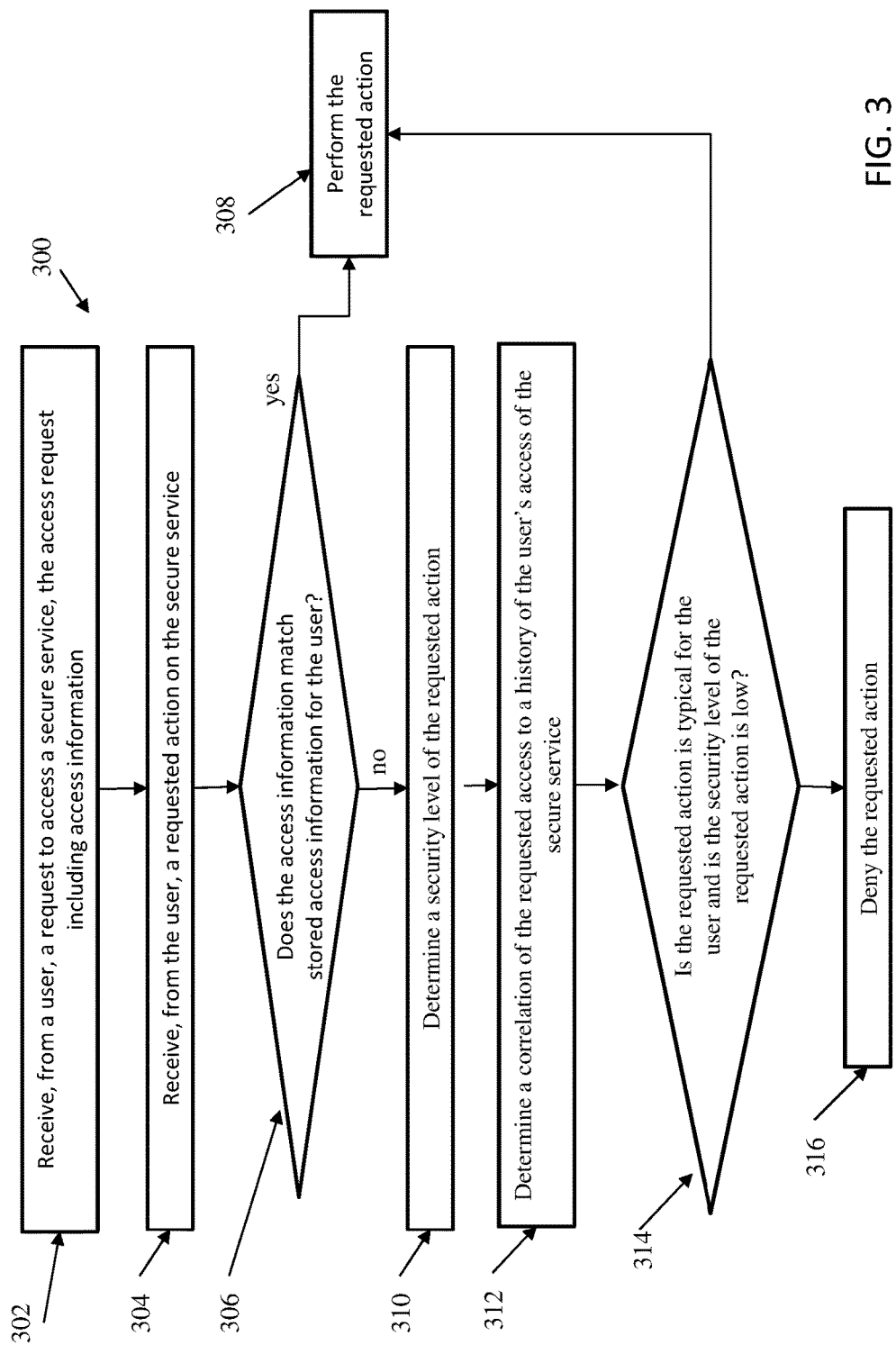
FIG. 3 illustrates an example of a method in accordance with one or more embodiments of the present invention.

Referring to FIG. 3, a flowchart of a method 300 for accessing a secure service in accordance with one or more embodiments of the present invention. As illustrated, at block 302, the method 300 includes receiving, from a user device, a request to access a secure service, the access request including access information. In exemplary embodiments, the access information can be a password, such as a personal identification number (PIN) entered via a numeric keypad or it may be an alphanumeric password entered via a QWERTY or similar keyboard. Next, at block 304, the access request includes a requested action associated with the secure service. In some embodiments, block 304 includes a determination of a security level associated with the requested action. In some embodiments, the security level associated with the requested action can be based on the risk associated with the requested action being performed. For example, the security level associated with a user attempting to deposit a check in a small dollar amount to an account could be lower compared to a security level associated with a request to withdraw a large amount of cash from the account.

Referring again to FIG. 3, at block 306, it is determined whether the access information received from the user matches stored access information. If the access information received from the user device matches the stored access information, the method 300 proceeds to block 308 and performs the requested action. Otherwise, the method 300 proceeds to block 310 and determines (or re-considers a previous determination of) a security level associated with the requested action.

Continuing with reference to FIG. 3, at block 312 a requested access is correlated to a history of the past accesses to the secure service. In some embodiments, determining a correlation of the requested access to a history of the user's access to the secure service can include analyzing whether the location of user's requested access is a location that the user frequently access the secure service from, i.e., the user's personal computer, smartphone or local ATM. In some embodiments, determining a correlation of the requested access to a history of the user's access to the secure service can include analyzing whether the requested access is the type of requested access frequently requested by the user, i.e., a standard ATM withdrawal amount or a common request to transfer money.

At decision block 314 it is determined whether the requested action is typical for the user and whether the security level of the requested action is low. If the requested action is typical for the user and the security level of the requested action is low, the method 300 proceeds to block 308 and performs the requested action. Otherwise, the method 300 proceeds to block 316 and denies the requested action. In some embodiments, the determination of whether the requested action is typical for the user is based on the correlation of the requested access to a history of access by the user device to the secure service.

Figure 4:
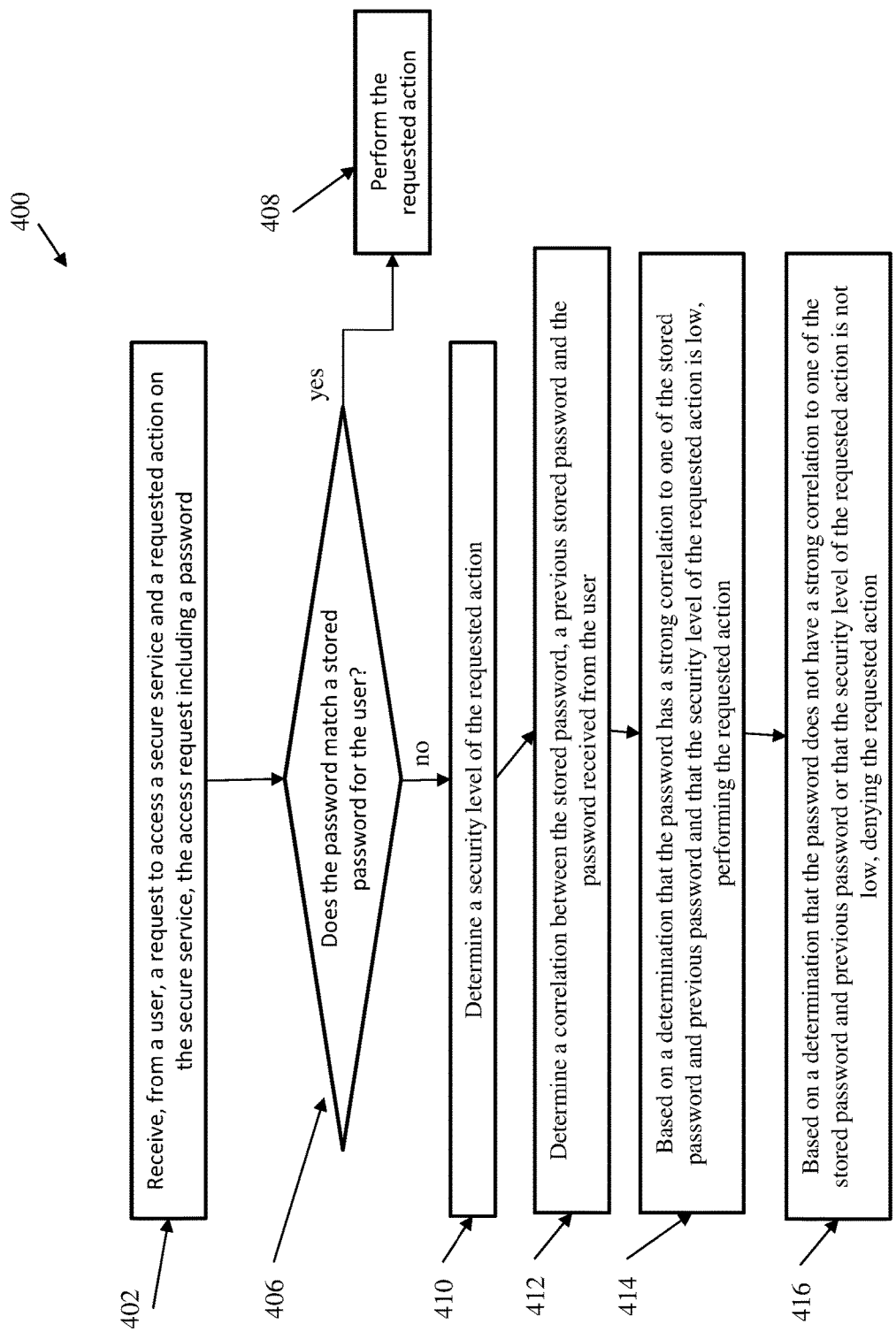
FIG. 4 illustrates another exemplary method in accordance with one or more embodiments of the present invention.

Referring to FIG. 4, another exemplary method in accordance with the present invention is shown. A block 402, the request is received to access a secure service and action requested to be performed on the secure service, the access request includes a password. As shown at decision block 406, the method 400 includes determining whether the password received from the user matches a stored password. If the password received from the user matches a stored password, the method 400 proceeds to block 408 and performs the requested action. Otherwise, the method 400 proceeds to block 410 and determines a security level of the requested action. In some embodiments, the security level of the requested action is based on a risk associated with requested action being performed by an unauthorized user.

Continuing with reference to FIG. 4, at block 412 a correlation is performed between one or more of the stored password, a previously stored password and/or the password received from the user device. In some embodiments, the correlation can include consideration of a Hamming distance, inter-character QWERTY distance or another proximity-type comparison between the current and/or previously stored password and/or the received password. At block 414, the requested action is performed, based on a determination that the received password has a strong correlation to one of the stored password or a previously password and that the security level of the requested action is low. At block 416, the requested is denied based on a determination that the password does not have a strong correlation to one of the stored password and/or a previous password and/or that the security level of the requested action is not low.

In some embodiments, the secure service can include default security levels that are assigned to the various actions that are provided by the secure service. In some embodiments, the user of the security service can customize the security levels that are assigned to the various actions that are provided by the secure service. For example, a default security level for withdrawing cash from an ATM in a state other than the user's home state may be high, but a user that travels often can set a custom security level for all ATM withdrawals made within his home country (and/or one or more specific destinations) to be low. In exemplary embodiments, the security levels can include high, medium and low or the security levels, which can be assigned a numerical value within a range, such as 0-10, with 0 being the lowest security level value and 10 being the highest security level.

Figure 5:
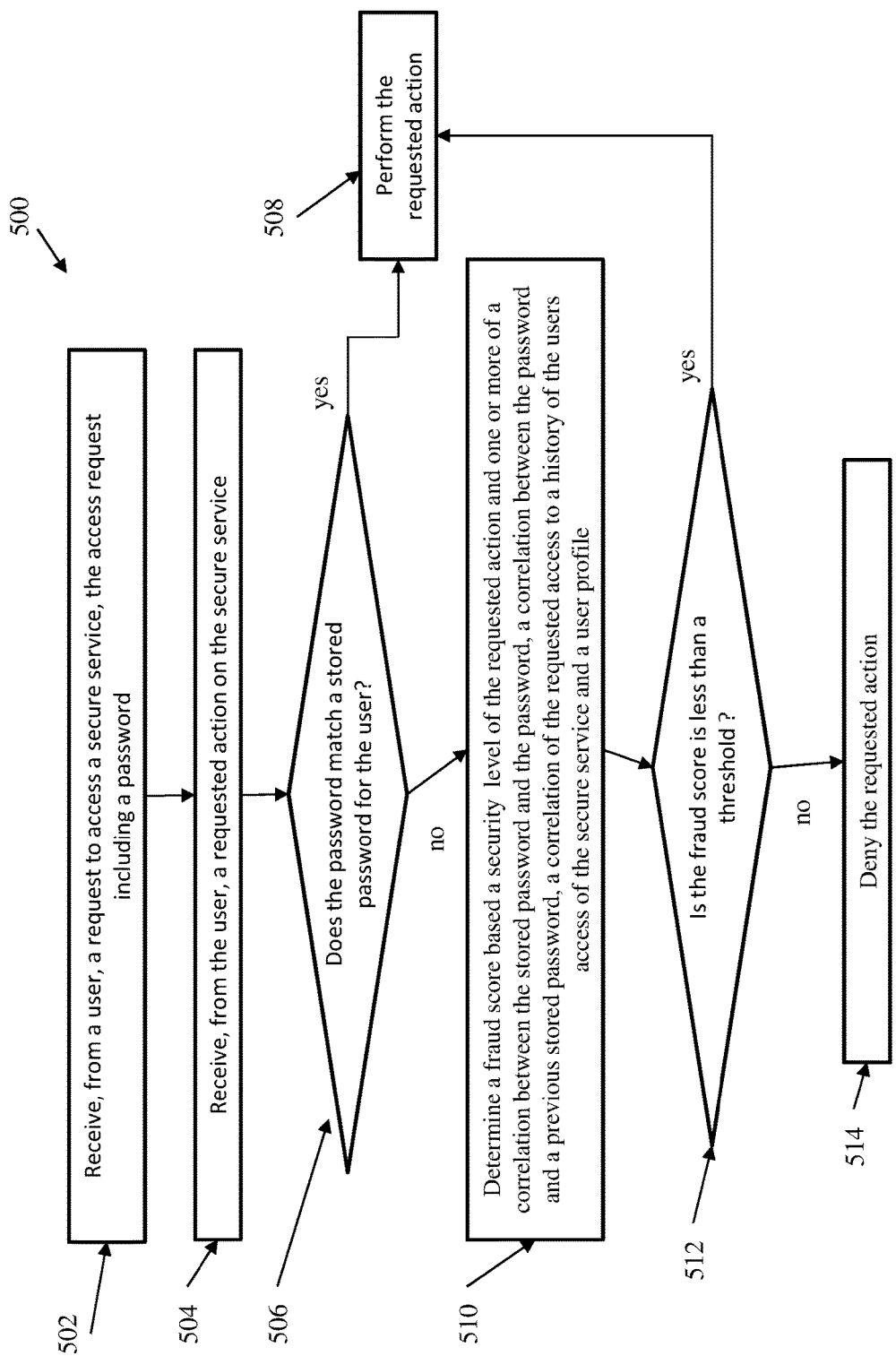
FIG. 5 illustrates yet another exemplary method in accordance with one or more embodiments of the present invention.

Referring to FIG. 5, another exemplary method 500 in accordance with the present invention is shown. At block 502, the method 500 includes receiving, from a user, a request to access a secure service, the access request including a password. Next, as shown at block 504, the method 500 includes receiving, from the user, a requested action on the secure service. As shown at decision block 506, the method 500 includes determining whether the password received from the user matches a stored password. If the password received from the user matches a stored password, the method 500 proceeds to block 508 and performs the requested action.

Continuing with reference to FIG. 5, as shown at block 510, the method 500 further includes determining a fraud score based a security level of the requested action and one or more of a correlation between the stored password and the received password, a correlation between the received password and a previous stored password, a correlation of the requested access to a history of the user's access to the secure service and a user profile. Next, as shown at decision block 512, the method 500 includes determining whether the fraud score is less than a threshold. If the fraud score is less than a threshold, the method 500 proceeds to block 508 and performs the requested action. Otherwise, the method 500 proceeds to block 510 and denies the requested action.

In some embodiments, the fraud score can be assigned to one of three categories, a high risk, a medium risk and a low risk. For example, the fraud score can be on a 0-100 scale and fraud scores below 50 are assigned to a low-risk category, fraud scores between 51-75 are assigned to a medium risk category and fraud scores above 76 are assigned to a high-risk category. Responsive to the fraud score, the secure system can not only grant or deny the requested action but it can also lock the user account from any further action until the user is authenticated. In one embodiment, a low-risk fraud request may be granted and no additional action can be performed by the secure system. A medium risk fraud request may be denied and no additional action is performed by the secure system. However, a high-risk fraud request may be denied and the secure system can lock the user account.

Some embodiments can further consider a spatial and/or temporal probability of fraud. For example, if the user device e.g., ATM is determined to be located in a region where with a relatively high prevalence of fraud, the risk factor can be automatically and accordingly increased. In another example, if the access attempt is determined to occur during a time of relatively high risk of fraud, the risk factor can be increased.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically identified device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a wireless LAN (WLAN using WiFi), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
   receiving, from a user device, a request to access a secure service, the request including access information, wherein the access information includes a received password;
   receiving, from the user device, a requested action on the secure service;
   correlating the access information and the requested action with stored information associated with the user device;
   determining a fraud score based on a correlation between the received password and one of a most recently stored password and a previously stored password;
   determining a security level associated with the requested action;
   based on a determination that the fraud score is less than a threshold level, performing the requested action;
   based on a determination that the fraud score is above the threshold level and that the security level is below a second threshold level, performing the requested action; and
   based on a determination that the fraud is above the threshold level and that the security level is above a second threshold level, denying the requested action.

2. The method of claim 1, wherein the fraud score is further based on:
   a correlation between the requested action and a history of the user device's access to the secure service; and
   a correlation between a user profile and the user device.

3. The method of claim 1, wherein the correlation between one of the most recently stored password and the previously stored password and the received password is based on a Hamming distance between the one of the most recently stored password and the previously stored password and the received password.

4. The method of claim 2, wherein the correlation between the requested action and the history of the user device's access to the secure service includes determining whether the requested action is a type of access frequently requested by the user device.

5. The method of claim 2, wherein the correlation of the requested action to the history of the user device's access to the secure service includes determining whether a location of the requested action is frequently used by the user device to access secure service.

6. The method of claim 1, further comprising determining a threshold level is received from the user device and storing the threshold level in a user profile associated with the user device.

7. The method of claim 2, wherein a security level of the requested action is determined based on a type of action associated with the requested action.

8. The method of claim 7, wherein the security level of the requested action is further based on a number of previous unsuccessful attempts to access the secure service during a time period.

9. A system for providing access to a secure service, the system comprising:
   at least one processor
   a memory, operably coupled to the at least one processor, the memory storing processor computer readable instructions;
   the at least one processor, configured to execute computer readable instructions, which cause the processor to:
      receive, from a user device, a request to access a secure service, the request including access information, wherein the access information includes a received password;
      receive, from the user device, a requested action on the secure service;
      correlate the access information and the requested action with stored information associated with the user device;
      determine a fraud score based on a correlation between the received password and one of a most recently stored password and a previously stored password;
      determine a security level associated with the requested action;
      based on a determination that the fraud score is less than a threshold level, perform the requested action;
      based on a determination that the fraud score is above the threshold level and that the security level is below a second threshold level, perform the requested action; and based on a determination that the fraud is above the threshold level and that the security level is above a second threshold level, deny the requested action.

10. The system of claim 9, wherein the fraud score is further based on:
 a correlation between the requested action and a history of the user device's access to the secure service; and
 a correlation between a user profile and the user device.

11. The system of claim 10, wherein the correlation between one of the most recently stored password and the previously stored password and the received password is based on a Hamming distance between the one of the most recently stored password and the previously stored password and the received password.

12. The system of claim 11, wherein the correlation between the requested action and the history of the user device's access to the secure service includes determining whether the requested action is a type of access frequently requested by the user device.

13. The system of claim 11, wherein the correlation of the requested action to the history of the user device's access to the secure service includes determining whether a location of the requested action is frequently used by the user device to access secure service.

14. The system of claim 10, further comprising determining a threshold level is received from the user device and storing the threshold level in a user profile associated with the user device.

15. The system of claim 11, wherein a security level of the requested action is determined based on a type of action associated with the requested action.

16. The system of claim 15, wherein the security level of the requested action is further based on a number of previous unsuccessful attempts to access the secure service during a time period.

17. A computer program product, the computer program product comprising a computer readable storage medium having program instructions embodied therewith, the program instructions executable by a processor to cause the processor to:

receive, from a user device, a request to access a secure service, the request including access information, wherein the access information includes a received password;
 receive, from the user device, a requested action on the secure service;
 correlate the access information and the requested action with stored information associated with the user device;
 determine a fraud score based on a correlation between the received password and one of a most recently stored password and a previously stored password;
 determine a security level associated with the requested action;
 based on a determination that the fraud score is less than a threshold level, perform the requested action;
 based on a determination that the fraud score is above the threshold level and that the security level is below a second threshold level, perform the requested action; and
 based on a determination that the fraud is above the threshold level and that the security level is above a second threshold level, deny the requested action.

18. The computer program product of claim 17, wherein the fraud score is further based on:
 a correlation between the requested action and a history of the user device's access to the secure service; and
 a correlation between a user profile and the user device.

19. The computer program product of claim 18, wherein the correlation between one of the most recently stored password and the previously stored password and the received password is based on a Hamming distance between the one of the most recently stored password and the previously stored password and the received password.

20. The computer program product of claim 18, wherein the correlation between the requested action and the history of the user device's access to the secure service includes determining whether the requested action is a type of access frequently requested by the user device.

* * * * *